United States Patent [19]

Tajima et al.

[11] Patent Number: 4,782,645

[45] Date of Patent: Nov. 8, 1988

[54] PACKAGING OF INFORMATION RECORDING MEDIA

[75] Inventors: Yukitoshi Tajima, Zama; Hiromitsu Sakamoto, Fujisawa; Nagisa Horiguchi, Yokohama, all of Japan

[73] Assignee: Victor Company of Japan, Ltd., Yokohama, Japan

[21] Appl. No.: 18,421

[22] Filed: Feb. 25, 1987

[30] Foreign Application Priority Data

Feb. 28, 1986 [JP] Japan .............................. 61-28617[U]

[51] Int. Cl.⁴ ......................... B65B 35/50; B65B 5/06
[52] U.S. Cl. ...................................... 53/409; 53/442; 53/447; 53/532; 53/581
[58] Field of Search ................. 53/581, 409, 204, 532, 53/443, 447, 442, 557, 449, 427

[56] References Cited

U.S. PATENT DOCUMENTS

| | | | |
|---|---|---|---|
| 2,875,909 | 3/1959 | Babick et al. | 53/204 X |
| 2,921,423 | 1/1960 | Cover et al. | 53/581 X |
| 3,002,327 | 10/1961 | Kirby | 53/581 |
| 3,737,028 | 6/1973 | Carlson | 53/409 X |
| 4,282,973 | 8/1981 | Binkowski | 53/442 X |

Primary Examiner—James F. Coan
Attorney, Agent, or Firm—Cushman, Darby & Cushman

[57] ABSTRACT

Disclosed is a method for packaging a number of disc-like information recording media each having a hole at its center portion. The disc-like information recording media are collected with the holes thereof being aligned with each other to form a cylindrical assembly with a through-hole, and an elongated member is inserted into the through-hole and a pair of collars are set on the elongated member from both ends thereof so as to fix the cylindrical assembly with respect to the elongated member. Thereafter, the cylindrical assembly is wrapped by a shrinkable material and encased in a container comprising upper and lower halves each having at least one assembly-receiving portion with a configuration substantially equal in dimension to the semicylindrical half portion of the cylindrical assembly. The container has an engaging arrangement comprising L-shaped extending portions and L-shaped shelf portions so that the upper and lower halves are stably coupled to each other.

1 Claim, 2 Drawing Sheets

PACKAGING OF INFORMATION RECORDING MEDIA

BACKGROUND OF THE INVENTION

The present invention relates generally to packaging of information recording media, and in particular to packaging of a number of disc-like information recording media such as compact discs and video discs.

One of major problems arising in connection with conveyance of information recording media such as compact discs and video discs is that the packaging is made so as to prevent the packaged information recording media from suffering damage due to impact during the carriage. One current method for packaging a number of information recording media involves separately putting one information recording medium into a non-woven fabric bag and further packing the information recording media in the units of a predetermined number before a number of information recording media packed in the units of the predetermined number are encased in a corrugated fibreboard container. However, this current method results in complexity and troublesome in packaging information recording media, causing a high packaging cost.

SUMMARY OF THE INVENTION

It is therefore an object of the present invention to provide new method and device for packaging a number of information media with simplification.

In accordance with a preferred embodiment of the present invention, there is provided a method for packaging a number of disc-like information recording media each having a hole at its center portion, comprising the steps of: collecting the disc-like information recording media with the holes thereof being aligned with each other to form a cylindrical assembly with a through-hole; inserting an elongated member into the through-hole; setting a pair of collars on the elongated member from both ends thereof so as to fix the cylindrical assembly with respect to the elongated member; and wrapping the cylindrical assembly by a shrinkable material. This wrapped cylindrical assembly is encased in a case comprising upper and lower halves each having a semicylindrical receiving portion which is formed to be substantially equal in demension to the semicylindrical half portion of the cylindrical assembly.

Preferably, the case has an engaging arrangement including L-shaped extending portions and L-shaped shelf portions so that the upper and lower halves are stably coupled to each other. The L-shaped extending portion are provided at corner portions of each of the upper and lower halves which are in diagonally opposed relation to each other and the L-shaped shelf portions are provided at the other corner portions thereof so that the L-shaped extending portions are engaged with the L-shaped shelf portions.

BRIEF DESCRIPTION OF THE DRAWINGS

The present invention will be described in further detail with reference to the accompanying drawings, in which.

DETAILED DESCRIPTION OF THE INVENTION

Figure 1:
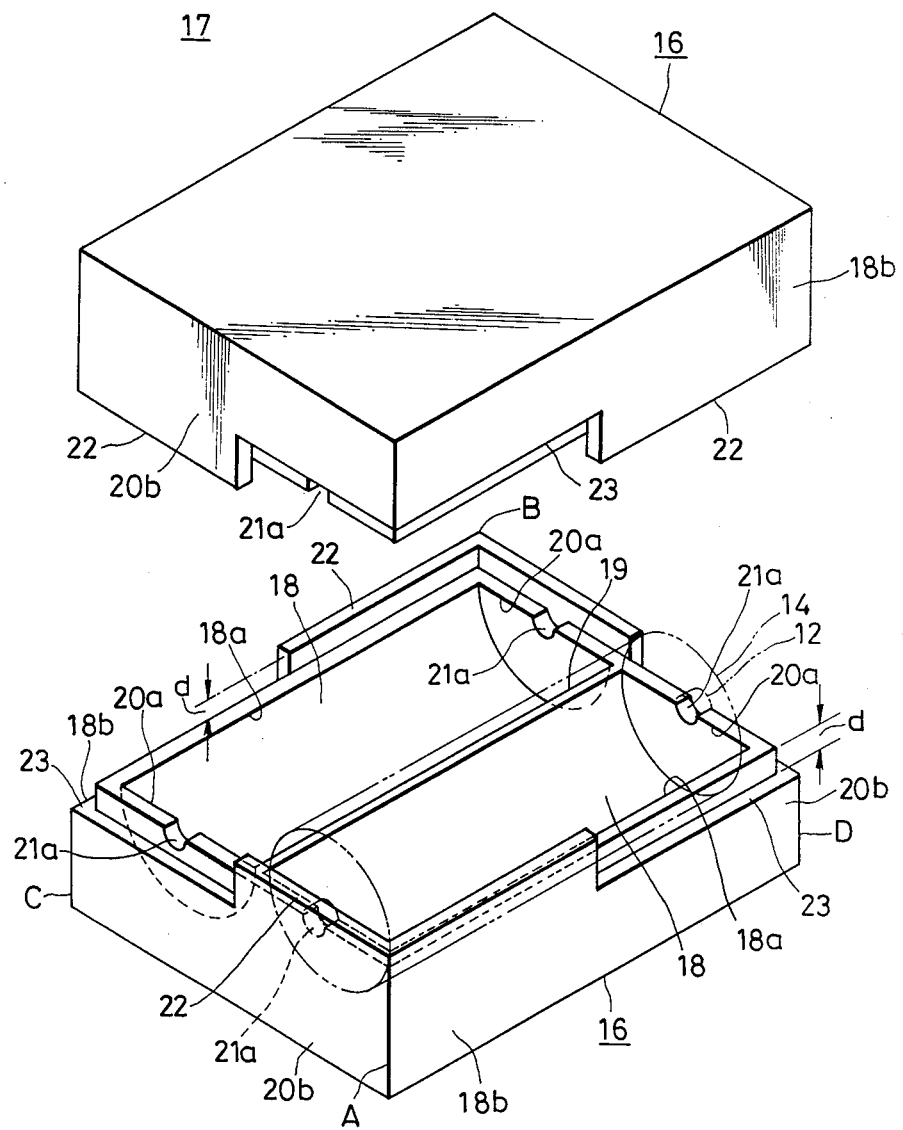
FIG. 1 is a perspective illustration of a case employed for packaging of information recording media according to an embodiment of the present invention.
Figure 3:
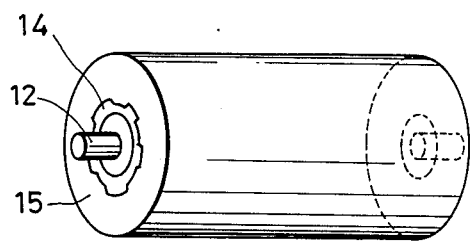
FIG. 3 is a perspective view showing a collected information media wrapped using a wrapping material.
Figure 4:
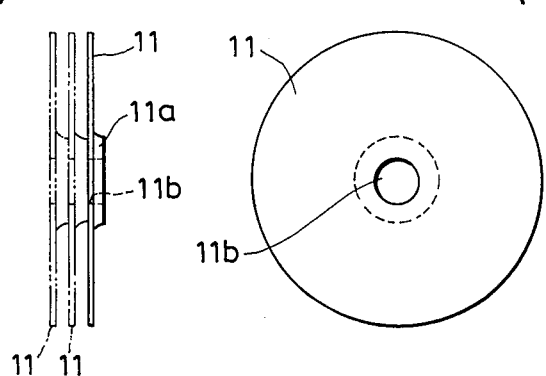
FIG. 4 is an illustration of information recording media preferably employed for the present invention.

Referring now to FIG. 1, there is illustrated a case for packaging of assemblies of information recording media shown in FIG. 3. The information recording medium 11 preferably employed for the present invention, as illustrated in FIG. 4, has disc-like configuration whose diameter is 120 mm for example and has a hole 11b at its center portion. Around the hole 11b and on the non-recorded surface is provided an annular protruding portion 11a whose diameter is 37 to 40 mm and whose height is about 1.55 mm.

Figure 2:
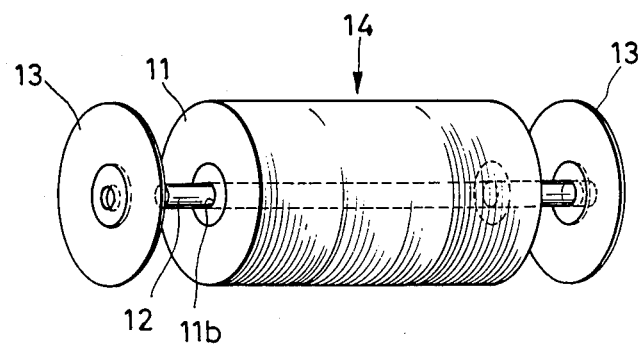
FIG. 2 is a perspective view for describing a method for the collection of information recording media.

In assembling a number of information recording media for forming an assembly thereof, as shown in FIG. 2, with the annular protruding portions 11a thereof being directed to one direction and the centers of the holes 11b being aligned with each other, an elongated member 12 such as a pipe is passed through the through-holes 11b and a pair of collars 13 each of which has a configuration substantially equal to that of the information recording medium 11 are set on the pipe 12 from both sides thereof, thereby forming a cylindrical disc assembly 14. The cylindrically formed disc assembly 14 is wrapped as shown in FIG. 3 by a material 15 shrinkable in response to, for example, heating process. The disc assembly 14 wrapped by the shrinkable material 15 is encased in a box-shaped case 17 comprising a pair of half-bodies 16 having the substantially same configurations and arrangements each other as shown in FIG. 1. The box-shaped case 17 may be made of a foam material containing polystyrene and polyethylene such as POK30 produced by Sekisui Kaseihin Kogyo Co., Ltd.

Each of the half-bodies 16 has therein one or a plurality of receiving portions 18 for receiving one or a plurality of the wrapped disc assembly 14, the plurality of receving portions 18 being arranged in parallel to each other with each of bulkhead plates 19 interposed therebetween and each of the receiving portions 18 having a semicylindrical wall 18a fitting the half of the cylindrical disc assembly 14 therein. Further, pairs of semicylindrical pipe-supporting portions 21a are formed in inner walls 20a and 20b of each of the half-bodies 16 provided in directions perpendicular to the surfaces of the semi-cylindrical walls 18a so that each of the pipes 12 is fitted therein and supported thereby. That is, the pair of semicylindrical pipe-supporting portions 21a act as a bearing for the pipe 12 inserted in the through-hole of the disc assembly 14.

At each of corner portions A and B of the half-body 16 which are in diagonally opposed relation to each other is provided a L-shaped extending portion 22 which is arranged to be protruded from outer walls 18b and 20b by a predetermined length d with respect to the inner wall 20a and an inner wall 18a as shown in FIG. 1. On the other hand, at each of the other corner portions C and D which are in diagonally opposed relation to each other is provided a L-shaped shelf portion 23 which is formed in the outer walls 18b and 20b to be indented by the predetermined length d with respect to the inner walls 18a and 20a, so that the L-shaped extending portion 22 is fitted in the L-shaped shelf portion 23. The L-shaped extending portion 22 is substantially equal in demension to the L-shaped shelf portion 23 and each of the longitudinal lengths of two portions of the L-shaped extending portion 22 or the L-shaped shelf portion 23 with respect to the corner thereof may be set to be substantially equal to half the longitudinal length of the corresponding outer wall.

Accordingly, when disc assembly 14 of FIG. 3 is fitted in each of the receiving portion 18 as indicated by one-dotted chain line in FIG. 1, the lower semicylindrical half portion of the disc assembly 14 is encased therein and the the pipe 12 is fitted in the pair of semicylindrical supporting portions 21a. In this case, the ends of the pipe 12 are brought into contact with the inner surfaces of the L-shaped extending portions 22, thereby preventing the disc assembly 14 from being moved in its axial directions.

After the disc assemblies 14 are encased in the receiving portions 18, the other half body 16 is put thereon to cover the disc assemblies 14 with the L-shaped extending portions 22 facing the L-shaped shelf portions 23. As a result of the covering of the disc assemblies 14, the disc assemblies 14 are respectively compltely remained in immovable state. This arrangement for packaging of information recording media sufficiently protects the information recording media against impact due to dropping and provides ease with which it can be manufactured at a relatively low cost, and allows simplification of the packaging of a number of information recording media.

It should be understood that the foregoing relates to only preferred embodiments of the invention, and that it is intended to cover all changes and modifications of the embodiments of the invention herein used for the purposes of the disclosure, which do not constitue departures from the spirit and scope of the invention.

What is claimed is:

1. A method for packaging a number of disc-like information recording media each having a hole at its center portion, comprising the steps of:

collecting said disc-like information recording media with the holes thereof being aligned with each other to form a cylindrical assembly with a through-hole;

inserting an elongated member into said through-hole;

setting a pair of collars on said elongated member from both ends so as to fix said cylindrical assembly with respect to said elongated member;

wrapping said cylindrical assembly by a shrinkable material; and encasing said wrapped cylindrical assembly in a case comprising first and second half bodies each having a semicylindrical receiving portion which is formed to be equal in dimension to the semicylindrical half portion of said cylindrical assembly.

* * * * *